(12) United States Patent
Mager et al.

(10) Patent No.: US 6,673,458 B2
(45) Date of Patent: Jan. 6, 2004

(54) PROCESS FOR PRODUCING SOL-GEL CONDENSATES BASED ON POLYFUNCTIONAL ORGANOSILANES

(75) Inventors: Michael Mager, Leverkusen (DE); Markus Mechtel, Köln (DE); Harald Kraus, Leverkusen (DE); Nusret Yuva, Wermelskirchen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/053,185

(22) Filed: Jan. 17, 2002

(65) Prior Publication Data

US 2002/0099161 A1 Jul. 25, 2002

(30) Foreign Application Priority Data

Jan. 23, 2001 (DE) .......................... 101 02 739

(51) Int. Cl.$^7$ .............................. B32B 15/08
(52) U.S. Cl. .................. 428/450; 428/402; 428/405; 428/446; 428/447; 528/34; 528/37
(58) Field of Search ................ 428/402, 405, 428/447, 446, 450; 528/37, 34

(56) References Cited

U.S. PATENT DOCUMENTS

| 4,476,281 | A | 10/1984 | Vaughn, Jr. .................. 524/767 |
| 5,880,305 | A | 3/1999 | Kraus et al. ................. 556/459 |
| 6,136,939 | A | 10/2000 | Mager et al. .................. 528/33 |
| 6,413,446 | B1 | 7/2002 | Mechtel et al. ............. 252/181 |
| 6,420,029 | B1 | * | 7/2002 | Tavernier et al. ........... 428/407 |

FOREIGN PATENT DOCUMENTS

| CA | 2267052 | | 9/1999 |
| EP | 0 967 253 | | 12/1999 |
| GB | 2 068 010 | | 8/1981 |
| JP | 55066133 | A * | 12/1981 |
| JP | 2001175573 | A * | 6/2001 |
| WO | 02/00767 | | 1/2002 |

* cited by examiner

*Primary Examiner*—Robert Dawson
*Assistant Examiner*—Marc S. Zimmer
(74) *Attorney, Agent, or Firm*—Joseph C. Gil; Thomas W. Roy; Gary Matz

(57) ABSTRACT

The present invention relates to a process for producing sol-gel condensates by
A1) reacting an aqueous silica sol with a silicon alkoxide and subsequently
A2) converting the condensate obtained from A1) with a polyfunctional organosilane.

10 Claims, 1 Drawing Sheet

PROCESS FOR PRODUCING SOL-GEL CONDENSATES BASED ON POLYFUNCTIONAL ORGANOSILANES

BACKGROUND OF THE INVENTION

1. Field of the Invention

The present invention relates to a process for producing sol-gel condensates by employing aqueous silica sols, and also to their use for coating of inorganic or organic substrates.

2. Description of the Prior Art

By co-condensation of $SiO_2$ nanoparticles with alkyltrialkoxysilanes, such as methyltrimethoxysilane for example, sol-gel condensates can be obtained which, for example, can be cured on plastic surfaces to form inorganic coatings having high scratch resistance. Production of these sol-gel condensates is effected by conversion of methyltrimethoxysilanes with an aqueous dispersion of $SiO_2$ nanoparticles (aqueous silica sol) in the presence of organic solvents, as described in U.S. Pat. No. 4,476,281 for example. The addition of organic solvents is necessary, since due to the presence of the hydrophobic alkyl residue neither the alkyltrialkoxysilanes that are employed nor the hydrolysis products and condensation products thereof are completely miscible with water.

In contrast with the sol-gel condensates that have been described based on alkyltrialkoxysilanes in which the organic residues are exclusively terminally bonded, through the use of polyfunctional organosilanes a chemical linkage of the organic residues with the inorganic network can be obtained. Polyfunctional organosilanes, as described in EP-A 0 947 520 for example, are linear, branched or cyclic monomeric oligosilanes that possess at least two silicon atoms with hydrolyzable and/or condensation-crosslinking groups, the silicon atoms each being bonded via at least one carbon atom to a linking structural unit.

Polyfunctional organosilanes in which the linking structural unit is a cyclic siloxane, e.g. cyclo-$\{OSi[(CH_2)_2Si(OH)(CH_3)_2]\}_4$, are of particular interest as starting materials for the production of sol-gel condensates, since, for example, sol-gel coatings with a scratch resistance similar to that of glass can be produced therefrom (see EP-A 0 947 520). These scratch-resistant coatings are of interest, in particular, in the production of automobile coatings. Furthermore, such sol-gel coatings are distinguished by pronounced hydrophobicity, enabling their use for the production of, for example, anti-graffiti coatings or fouling-release coatings (e.g. EP-A 967 253).

With a view to producing sol-gel condensates that are suitable for the coating of surfaces, the polyfunctional organosilane is conventionally converted not on its own but in combination with metal alkoxides and/or nanoparticles. By suitable choice of the quantitative ratios, the hydrophobicity and the hardness of the resulting coating can be adjusted, depending on the requirements. In this connection it has previously been a great disadvantage that the conversion of the polyfunctional organosilanes with $SiO_2$ nanoparticles in the presence of metal alkoxides was only possible by using solvent-containing $SiO_2$ nanoparticle dispersions, so-called organosols (e.g. EP-A 0 947 520). Most polyfunctional organosilanes are totally immiscible with water and are consequently also incompatible with aqueous dispersions of $SiO_2$ nanoparticles (aqueous silica sols). The production of organosols, however, is substantially more elaborate than that of corresponding aqueous silica sols that are available on the market as standard commercial products (e.g. Levasil, Bayer AG, Leverkusen).

An object of the present invention is to provide a process that enables the incorporation of aqueous silica sols into sol-gel condensates based on polyfunctional organosilanes.

It has now been found that condensates that are miscible with polyfunctional organosilanes can be obtained by reaction of an aqueous silica sol with a silicon alkoxide.

SUMMARY OF THE INVENTION

The present invention relates to a process for producing sol-gel condensates by

A1) reacting an aqueous silica sol with a silicon alkoxide and subsequently

A2) converting the condensate obtained from A1) with a polyfunctional organosilane.

DETAILED DESCRIPTION OF THE INVENTION

Figure 1:
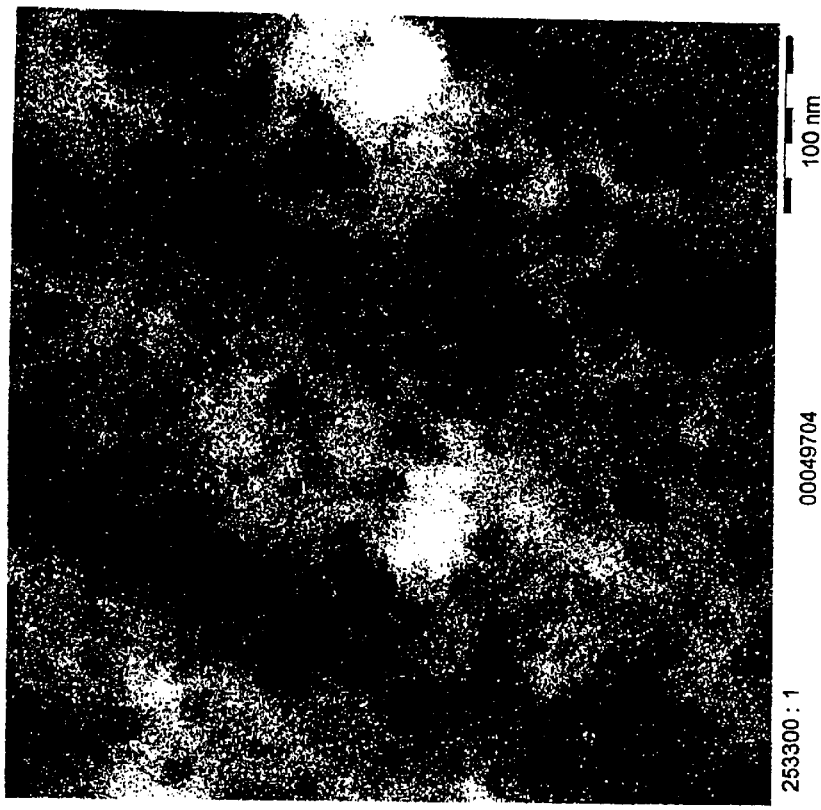
FIG. 1 represents an electron microscope photograph of a coating prepared from the sol-gel condensates of the present invention.
Figure 1:
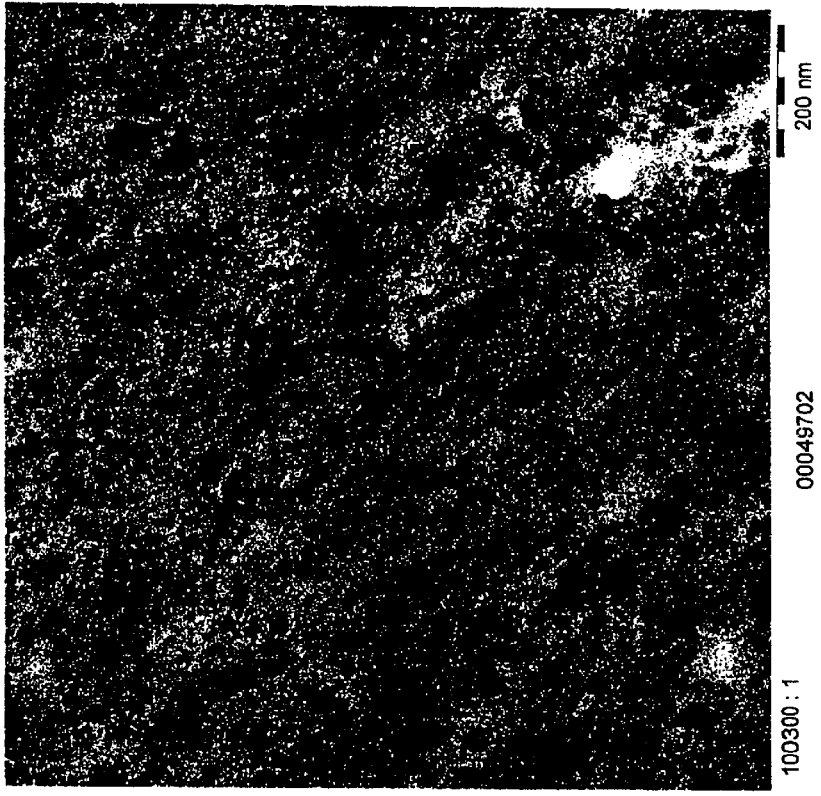

In a preferred embodiment of the process according to the invention

B1) a silicon alkoxide is dissolved in a solvent and with stirring the aqueous silica sol is added, and subsequently B2) the condensate obtained from B1) is converted with a polyfunctional organosilane.

In the first step A1 or B1 of the process according to the invention, hydrolysis of the alkoxysilyl groups of the silicon alkoxide is effected. The silanol groups (Si—OH) that are formed can condense either with themselves or with alkoxysilyl groups still present with the elimination of water or alcohol, respectively, while forming Si—O—Si bonds. However, the $SiO_2$ nanoparticles contained in the silica sol exhibit a reactive surface which is also available for reaction with the silicon alkoxides or the hydrolysis products thereof. Particles are obtained that can be designated as surface-modified and that consequently possess miscibility with polyfunctional organosilanes.

Suitable polyfunctional organosilanes for the process according to the invention are linear, branched or cyclic monomeric organosilanes that contain at least two silicon atoms with hydrolyzable and/or condensation-crosslinking groups, the silicon atoms each being bonded via at least one carbon atom to a linking structural unit.

Preferred polyfunctional organosilanes correspond to formula (I)

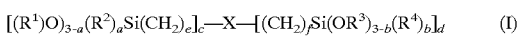

$$[(R^1)O)_{3-a}(R^2)_a Si(CH_2)_e]_c—X—[(CH_2)_f Si(OR^3)_{3-b}(R^4)_b]_d \qquad (I)$$

in which $R^1$, $R^2$, $R^3$ and $R^4$ independently of one another are $C_1$-$C_8$ alkyl residues or phenyl residues, and $R^1$ and $R^3$ may also be H, a, b independently of one another are 0, 1 or 2, c, d, and e, f independently of one another are greater than or equal to 1, and X is a bridging structural unit or a linear, branched or cyclic siloxane, carbosilane or carbosiloxane.

In a particularly preferred embodiment, cyclic carbosilanes of formula (II) are employed

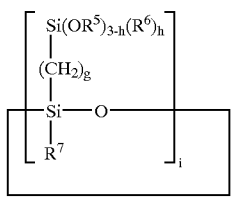

(II)

in which
R$^5$, R$^6$ and R$^7$ independently of one another are C$_1$-C$_4$ alkyl residues, and R$^5$ may also be H,
h is 0, 1 or 2,
g is an integer from 1 to 4, and
i is an integer from 3 to 10.

Preferred carbosiloxanes are those of formulae (IIIa) to (IIIe), in which R$^8$ is methyl or ethyl.

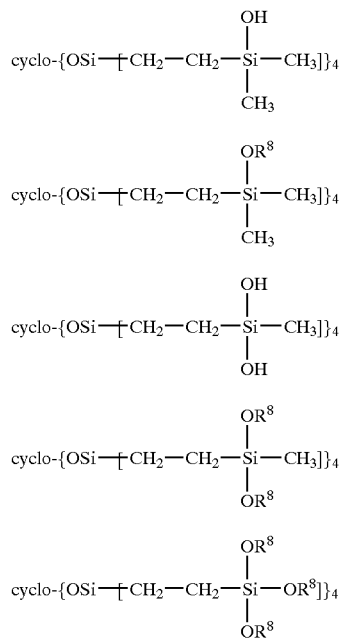

The oligomers of the cyclic carbosiloxanes that are disclosed in WO 98/52992 (U.S. Pat. No. 6,136,939, herein incorporated by reference) can also be employed in the process according to the invention as polyfunctional organosilanes. In addition, it is possible to use mixtures of various cyclic monomeric or oligomeric carbosiloxanes.

Aqueous silica sols that are suitable for the process according to the invention are dispersions of amorphous, predominantly SiO$_2$-containing nanoparticles with a preferred mean primary-particle size of 5 to 500 nm which are present for the most part as individual particles. With a view to producing transparent coatings, mean primary-particle sizes from 5 to 100 nm are particularly preferred. The aqueous silica sols can be stabilized by acids or bases. The pH value of the silica sols can optionally be adjusted by addition of acids or bases.

In order to keep the water content as low as possible in the sol-gel condensates produced in accordance with the invention, the concentration of the aqueous silica sols can be increased by distilling off at normal pressure and at elevated temperature or at diminished pressure and optionally at elevated temperature. The content of SiO$_2$ nanoparticles in the aqueous silica sols is preferably 20 to 80 wt. %, more preferably 30 to 60 wt. %.

Suitable silicon alkoxides that can be used to react with the aqueous silica sol in accordance with the process according to the invention are preferably those of formula (IV)

$$(R^9)_a Si(OR^{10})_{4-a} \qquad (IV)$$

in which
a is 0, 1, 2 or 3,
R$^9$ is an optionally substituted alkyl or aryl residue, and
R$^{10}$ is a C$_1$ to C$_3$ alkyl residue.

Particularly preferred are silicon alkoxides of the formula (IV), in which
a is 0 or 1,
R$^9$ is a methyl residue, and
R$^{10}$ is a methyl or ethyl residue.

Examples of preferred silicon alkoxides are those of formulae (Va) to (Vc), where R$^{11}$ is a methyl or ethyl residue:

$$Si(OR^{11})_4 \qquad (Va)$$

$$CH_3—Si(OR^{11})_3 \qquad (Vb)$$

$$C_6H_5—Si(OR^{11})_3. \qquad (Vc)$$

In a preferred embodiment of the process according to the invention, in a first step (A1/B1) the silicon alkoxide is dissolved in a suitable solvent, e.g. alcohol, then the aqueous silica sol is added, with stirring. After the addition has been concluded, the reaction mixture is stirred until it is homogenous, i.e., no emulsion is present or no precipitate is visible. In the second step the polyfunctional organosilane, which can optionally be dissolved beforehand in a suitable solvent, is added.

With the process according to the invention the composition of sol-gel condensates based on the polyfunctional organosilanes, metal alkoxides and SiO$_2$ nanoparticles can be varied over a wide range. The sol-gel condensates preferably exhibit the following theoretical composition (complete hydrolysis and condensation are assumed for the purpose of calculation): 10 to 90 wt. %, preferably 15 to 60 wt. %, of polyfunctional organosilane, 10 to 90 wt. %, preferably 40 to 85 wt. %, of the hydrolysis products of the metal alkoxide(s) and SiO$_2$ nanoparticles, whereby the hydrolysis products of the metal alkoxide(s) and SiO$_2$ nanoparticles are employed in a weight ratio from 10:1 to 1:10, preferably 8:1 to 1:5.

In order to prevent an excessively rapid gelling of the sol-gel condensates, the solids content is adjusted to 10 to 50 wt. %, preferably 15 to 45 wt. %, by addition of an organic solvent. The solvent, which should be at least partially miscible with water, is preferably added before or during the production of the sol-gel condensate. The resulting solids content of the sol-gel condensate can be calculated from the proportions by weight of the individual components, taking into account the loss in weight of the polyfunctional organosilanes and the metal alkoxide as a result of hydrolysis and condensation (the theoretical loss in weight of Si(OC$_2$H$_5$)$_4$ amounts to 72 wt. %, for example).

The addition of organic solvents is also an advantage for the production of homogeneous coatings from the sol-gel condensates that have been produced in accordance with the invention. In particular, in the case of sol-gel condensates with a high content of aqueous silica sol, segregation in the (inorganic) coating that forms is prevented from occurring through the addition of organic solvents. In this connection the addition of organic solvents that are at least partially miscible with water and have a boiling-point of at least 80° C. is particularly advantageous. In particularly preferred manner these solvents form azeotropic mixtures with water, as a result of which the sol-gel condensates can be freed of excess water by distilling off at normal pressure and at elevated temperature or in a vacuum at optionally elevated temperature by azeotropic distillation. In addition to the removal of water by means of azeotropic distillation, the sol-gel condensate can be recrystallized by removal of readily volatile solvents.

The sol-gel condensates that have been produced by the process according to the invention from one or more polyfunctional organosilanes are suitable, in particular, for the coating of inorganic or organic substrates. After application, which may be undertaken by standard techniques (e.g. brushing, spraying, rolling, centrifuging, dipping), the volatile constituents are vaporized at −10° C. to 200° C. and the sol-gel condensate on the surface is cured. In this way, inorganic coatings with high resistance to weathering, scratching and chemicals can be obtained on metals, ceramics, glass, wood and plastics. In particular, substrates that have already been coated with an organic coating, such as a polyurethane layer for example, can be coated with the sol-gel condensates that have been produced in accordance with the invention. Because of the nanoparticles contained in the sol-gel condensates, the coatings that are produced with the sol-gel condensates obtained in accordance with the invention are very resistant to cracking by reason of moisture and/or fluctuations in temperature. This cannot be obtained with other inorganic clear lacquers on moisture-absorbing subsurfaces such as, for example, polyurethane lacquers, since cracking occurs as a result of swelling. The sol-gel condensates that are produced in accordance with the invention can, for example, be employed for the coating of vehicles, which are then distinctly more insensitive to scratches (e.g. as a result of cleaning in a car wash).

The sol-gel condensates that are produced in accordance with the invention can also be employed for the inorganic modification of organic polymers which then, for example, find use as moldings or coatings. Preferred organic polymers or polymer mixtures are those based on polyacrylates, polyesters, polyisocyanates, polyurethanes and epoxides that are employed for the production of coatings.

The sol-gel condensate according to the invention can, for example, either be mixed directly with the organic polymers or alternatively the condensate (A1 or B1) obtained from the reaction of an aqueous silica sol with a silicon alkoxide is firstly mixed with the organic polymers and only subsequently converted, in accordance with the invention, with a polyfunctional organosilane.

The condensate A1 or B1 is preferably mixed with the organic polymers and only subsequently converted with a polyfunctional organosilane.

The portion of the organic polymers in the cured coating or in the moldings is preferably between 10 and 90 wt. %, preferably between 30 and 70 wt. %.

EXAMPLES

Remarks

The D4-diethoxide oligomer, a condensation product of monomeric cyclo-$\{OSi[(CH_2)_2Si(OEt)_2(CH_3)]\}_4$, that was employed was produced as described in WO 98/52992 (U.S. Pat. No. 6,136,939, previously incorporated by reference). Cyclo-$\{OSi[(CH_2)_2Si(OH)(CH_3)_2]\}_4$ was produced according to the teachings of U.S. Pat. No. 5,880,305. The aqueous silica sols that were employed were Levasil 200/30 and 200S/30 produced by Bayer AG, Leverkusen, Germany. Levasil 200/30 is an anionically stabilized dispersion of amorphous $SiO_2$ nanoparticles (30 wt. % $SiO_2$ in the form supplied), with a mean particle size of 15 nm and a BET surface area of 200 $m^2/g$. Prior to use, the pH value of Levasil 200/30 was adjusted from 9 to 2 by addition of concentrated hydrochloric acid. Levasil 200S/30 is a corresponding dispersion cationically stabilized with aluminium salts. Prior to use, the pH value of Levasil 200S/30 was adjusted from 3.8 to 2 by addition of concentrated hydrochloric acid. Production of the aqueous silica sols with higher solids content was effected by condensing water in a vacuum (rotary evaporator). By this means, solids contents of 45 to 55 wt. % $SiO_2$ could be obtained without the aqueous silica sol gelling. Tetraethyl orthosilicate (=TEOS) as well as 1-methoxy-2-propanol, 1-butanol and 2-butanol (all produced by Aldrich) were employed without further purification.

Desmophen A665 BA/X is a polyacrylate-based polyol which is employed for polyurethane coatings and produced by Bayer AG, Leverkusen, Germany.

The solids content was determined by evaporative concentration of a 1 g of sample in a crystallizing dish (0=7.5 cm) at 130° C. (1 h) in a circulating-air oven. The resistance to moisture of the inorganic coatings produced from the sol-gel condensates was determined by application onto a test plate, which exhibited a layered structure typical in automobile coating, and aging of the test plate in distilled water at 50° C. The cracking was assessed (visually).

The pencil hardness was determined as specified in ASTM D 3363–92a. The organic polymers modified with the sol-gel condensates were tested by application onto a test plate that exhibited a layered structure typical in automobile lacquering (4 layer built up); however, the inorganically modified polymer was applied instead of the surface coating (clear coating).

Example 1

Production of a sol-gel condensate with 4.5 wt. % $SiO_2$ nanoparticles a) With stirring, 17.5 g of a 0.1-N aqueous p-toluenesulfonic acid solution was charged to 204.2 g of TEOS and 50 g of ethanol. The reaction mixture was stirred for 1 h at room temperature; then 25 g of Levasil 200 (pH=2, 30 wt. % $SiO_2$) diluted with 8 ml ethanol were added dropwise and stirred for a further 2 h. The solids content of the TEOS-Levasil condensate obtained amounted to 29.8 wt. %.

b) With stirring, 50 g of D4-diethoxide oligomer and 8 g of a 0.1-N aqueous p-toluenesulfonic acid solution were charged to 100 g of the TEOS-Levasil condensate obtained in a) and stirring was continued for 1 h at room temperature. A homogeneous, slightly opaque sol-gel condensate was obtained which contained 4.5 wt. %, based on solids, of $SiO_2$ nanoparticles from the Levasil 200 employed.

Example 2

Production of inorganic coatings from the sol-gel condensate from Example 1 and testing of the resistance to moisture.

The sol-gel condensate obtained in accordance with Example 1 was applied onto a sheet-metal automobile panel by spraying and, after being left for 10 min at room temperature, was cured for 10 min at 80° C. and for 30 min at 130° C. (dry-layer thickness about 3 $\mu$m). After cooling, the test plate was stored for 7 days at 50° C. in distilled water. No cracks occurred in the transparent, inorganic surface layer.

Example 3

Production of a sol-gel condensate with 24.8 wt. % $SiO_2$ nanoparticles a) Within 2 h, 106.5 g of TEOS were added dropwise, with vigorous stirring, to a mixture of 74.3 g of Levasil 200 (pH=2, 50.2 wt. % $SiO_2$) and 100 g of 1-methoxy-2-propanol. In the process the temperature of the reaction mixture rose to 35° C. After the addition was over, stirring was continued for a further 90 min. The solids content of the TEOS-Levasil condensate obtained was 28.2 wt. %.

b) With stirring, 3.7 g of 1-butanol and 2.2 g of D4-diethoxide oligomer were charged to 5 g of the TEOS-Levasil condensate obtained in accordance with a) and stirring was continued for 30 min at room temperature. After the addition of 4 drops of a 1-N aqueous p-toluenesulfonic acid solution and further stirring for 60 min, a homogeneous, slightly opaque sol-gel condensate was obtained which contained 24.8 wt. %, based on solids, of $SiO_2$ nanoparticles from the Levasil 200 employed.

Example 4

Production of inorganic coatings from the sol-gel condensate from Example 3 and testing of the pencil hardness.

The sol-gel condensate from Example 3b) was applied onto a glass plate by means of blade coating (slit width 120 μm) and cured for 10 min at room temperature and for 1 h at 130° C. A homogeneous, highly transparent inorganic coating was obtained which exhibited a pencil hardness of 5 H.

Example 5

Production of a sol-gel condensate analogous to Example 3 using 1-pentanol, as well as production and testing of an inorganic coating.

As described in Example 3, a sol-gel condensate was produced in which 1-pentanol was employed as the solvent instead of 1-butanol. After application and curing as described in Example 4, a homogeneous, highly transparent inorganic coating was obtained which exhibited a pencil hardness of 4 H.

Example 6

Production of a sol-gel condensate with 26.8 wt. % $SiO_2$ nanoparticles a) Within 1 h, 79.9 g of TEOS were added dropwise, with vigorous stirring, to a mixture of 77.7 g of Levasil 200 (pH=2, 48.0 wt. % $SiO_2$) and 100 g of 1-methoxy-2-propanol. In the process the temperature of the reaction mixture rose to 32° C. After the addition was over, stirring was continued until the reaction mixture had cooled to room temperature (about 1 h). The solids content of the TEOS-Levasil condensate obtained was 25.8 wt. %.

b) With stirring, 2.5 g of 1-pentanol and 1.6 g of D4-diethoxide oligomer were charged to 3.5 g of the TEOS-Levasil condensate obtained in accordance with a). After the addition of 4 drops of a 1-N aqueous p-toluenesulfonic acid solution and further stirring for 60 min, a homogeneous, slightly opaque sol-gel condensate was obtained which contained 26.8 wt. %, based on solids, of $SiO_2$ nanoparticles from the Levasil 200 employed.

Example 7

Production of a sol-gel condensate with 30.1 wt. % $SiO_2$ nanoparticles a) Within 1 h, 59.9 g of TEOS were added dropwise, with vigorous stirring, to a mixture of 70.7 g of Levasil 200 (pH=2, 52.7 wt. % $SiO_2$) and 100 g of 1-methoxy-2-propanol. In the process the temperature of the reaction mixture rose to 33° C. After the addition was over, stirring was continued until the reaction mixture had cooled to room temperature (about 1 h). The solids content of the TEOS-Levasil condensate obtained was 26.5 wt. %.

b) With stirring, 3.7 g of 1-pentanol and 2.2 g of D4-diethoxide oligomer were charged to 5 g of the TEOS-Levasil condensate obtained in accordance with a). After the addition of 4 drops of a 1-N aqueous p-toluenesulfonic acid solution and further stirring for 60 min, a homogeneous, slightly opaque sol-gel condensate was obtained which contained 30.1 wt. %, based on solids, of $SiO_2$ nanoparticles from the Levasil employed.

Example 8

Production of a sol-gel condensate with 32.4 wt. % $SiO_2$ nanoparticles a) Within 1 h, 44.9 g of TEOS were added dropwise, with vigorous stirring, to a mixture of 77.7 g of Levasil 200 (pH=2, 52.7 wt. % $SiO_2$) and 100 g of 1-methoxy-2-propanol. In the process the temperature of the reaction mixture rose to 31° C. After the addition was over, stirring was continued until the reaction mixture had cooled to room temperature (about 1 h). The solids content of the TEOS-Levasil condensate obtained was 24.6 wt. %.

b) With stirring, 3.7 g of 1-pentanol and 2.2 g of D4-diethoxide oligomer were charged to 5 g of the TEOS-Levasil condensate obtained in accordance with a). After the addition of 4 drops of a 1-N aqueous p-toluenesulfonic acid solution and further stirring for 60 min, a homogeneous, slightly opaque sol-gel condensate was obtained which contained 32.4 wt. %, based on solids, of $SiO_2$ nanoparticles from the Levasil employed.

Example 9

Production of a sol-gel condensate with 25.8 wt. % $SiO_2$ nanoparticles, production of an inorganic coating and testing of the dispersed state of the $SiO_2$ nanoparticles (for TEM photograph see FIG. 1):

a) Within 2 h, 106.5 g of TEOS were added dropwise, with stirring, to a mixture of 74.3 g of Levasil 200 (pH=2, 50.2 wt. % $SiO_2$) and 100 g of 1-methoxy-2-propanol. In the process the temperature rose to about 35° C. After the addition was over, the homogeneous reaction mixture was stirred for a further 90 min.

b) 117 g of n-butanol and 44.3 g of D4-diethoxide oligomer were added, with stirring, to 100 g of the TEOS-Levasil condensate obtained in accordance with a) and 48.9 g of volatile constituents (predominantly n-butanol and water) were removed with a rotary evaporator.

c) Finally, a further 0.3 g of an aqueous p-toluenesulfonic acid solution was charged to 10 g of the sol-gel condensate obtained in accordance with b), with stirring. After 1 h of stirring the reaction mixture at room temperature, a polycarbonate plate and a glass plate were then coated by means of blade coating (120 μm slit width).

After curing (10 min at room temperature, 60 min at 130° C. in a circulating-air oven), a homogeneous film was obtained having outstanding transparency and high hardness (pencil hardness 4 H, on glass).

The coating on the polycarbonate plate was investigated by means of TEM, whereby an excellent distribution of the $SiO_2$ nanoparticles in the inorganic matrix (consisting of TEOS and D4-diethoxide oligomer) was found. The TEM photographs are documented at FIG. 1.

Example 10

Modification of an organic polymer with a sol-gel condensate produced in accordance with the invention, as well as production and testing of a coating formed therefrom a) With stirring, 17.5 g of a 0.1-N aqueous p-toluenesulfonic acid solution were charged to 204.2 g of TEOS and 50 g of ethanol. The reaction mixture was stirred for 1 h at room temperature; then 25 g of Levasil 200S (pH=2, 30 wt. % $SiO_2$) diluted with 10 g of ethanol were added dropwise, stirring was continued for a further 15 min, and 200 g of 2-butanol were added. Subsequently 243 g of solvent were distilled off at normal pressure and the residue was adjusted to a quantity of 265.6 g by addition of 1.9 g of 2-butanol, resulting in a theoretical (calculated) solids content of 25%. Subsequently, filtering was effected via a pressure nutsch (0.6 μm). A homogeneous, slightly opaque condensate was obtained.

b) 198.5 g of the condensate produced under a) were mixed with 109.5 g of Desmophen A 665 BA/X and stirred for 15 min. A homogeneous mixture was obtained that was stable in storage.

c) 88.0 g of the mixture produced under b) were added, with stirring, to 6.2 g of a 50-% cyclo-$\{OSi[(CH_2)_2Si(OH)(CH_3)_2]\}_4$ in 2-butanol and 5.8 g of a 0.1-N aqueous p-toluenesulfonic acid solution and stirring was continued for a further 2 h. A polymer was obtained that had been modified with a sol-gel condensate produced in accordance with the invention.

d) The inorganically modified polymer produced in accordance with c) was applied instead of a traditional surface coating (conventional automotive clear coating) onto a sheet-metal automobile panel by means of spraying and subsequently cured for 5 min at room temperature and for 30 min at 140° C. After cooling, the test plate was stored for 7 days at 50° C. in distilled water. No cracks occurred in the transparent coating.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing sol-gel condensates which comprises
    A1) reacting an aqueous silica sol with a silicon alkoxide and subsequently
    A2) converting the condensate obtained from A1) with a polyfunctional organosilane.

2. The process of claim 1 which comprises
    B1) dissolving a silicon alkoxide in a solvent and, with stirring, adding an aqueous silica sol and subsequently
    B2) converting the condensate obtained from B1) with a polyfunctional organosilane.

3. The process of claim 1 wherein the polyfunctional organosilane is a compound of formula (I):

$$[(R^1O)_{3-a}(R^2)_aSi(CH_2)_e]_c\text{—}X\text{—}[(CH_2)_fSi(OR^3)_{3-b}(R^4)_b]_d \quad (I)$$

in which
    $R^1$, $R^2$, $R^3$ and $R^4$ independently of one another are $C_1$-$C_8$ alkyl residues or phenyl residues,
    a, b independently of one another are 0, 1 or 2,
    c, d, and e, f independently of one another are greater than or equal to 1, and
    X is a bridging structural unit or a linear, branched or cyclic siloxane, carbosilane or carbosiloxane.

4. The process of claim 1 wherein the polyfunctional organosilane is a compound of formula (II):

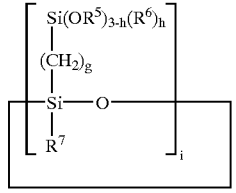

(II)

in which
    $R^5$, $R^6$ and $R^7$ independently of one another are $C_1$-$C_4$ alkyl residues,
    h is equal to 0, 1 or 2,
    g is an integer from 1 to 4, and
    i is an integer from 3 to 10.

5. The process of claim 1 wherein the silicon alkoxide is a compound of formula (IV):

$$(R^9)_aSi(OR^{10})_{4-a} \quad (IV)$$

in which
    a is 0, 1, 2 or 3,
    $R^9$ is an optionally substituted alkyl or aryl residue, and
    $R^{10}$ is a $C_1$ to $C_3$ alkyl residue.

6. The process of claim 5 wherein
    a is 0 or 1,
    $R^9$ is a methyl residue, and
    $R^{10}$ is a methyl or ethyl residue.

7. A sol-gel condensate obtained by the process of claim 1.

8. An inorganic or organic substrate coated with the sol-gel condensate of claim 7.

9. The inorganic or organic substrate of claim 8 wherein the substrate is selected from the group consisting of metals, ceramics, glass, wood, plastics and substrates coated with organic coatings.

10. A composition containing an organic polymer and the sol-gel condensate of claim 7.

* * * * *